United States Patent

[11] 3,613,787

| [72] | Inventors | William C. Tosch<br>Parker;<br>Charles B. Wenger, Denver, both of Colo. |
|---|---|---|
| [21] | Appl. No. | 853,919 |
| [22] | Filed | Aug. 28, 1969 |
| [45] | Patented | Oct. 19, 1971 |
| [73] | Assignee | Marathon Oil Company<br>Findlay, Ohio |

[54] SECONDARY OIL RECOVERY PROCESS USING MICELLAR DISPERSIONS
17 Claims, No Drawings

[52] U.S. Cl. .................................................. 166/273
[51] Int. Cl. .................................................. E21b 43/22
[50] Field of Search ...................................... 166/273, 246, 274, 275, 305; 252/8.55

[56] References Cited
UNITED STATES PATENTS

| 2,771,138 | 11/1956 | Beeson .......................... | 166/274 |
| 3,254,714 | 6/1966 | Gogarty et al. ................ | 166/274 |
| 3,434,542 | 3/1969 | Dotson et al. ................. | 166/273 |
| 3,446,282 | 5/1969 | Cooke, Jr. ..................... | 166/274 |
| 3,497,006 | 2/1970 | Jones et al. ................... | 166/273 |
| 3,506,070 | 4/1970 | Jones ............................ | 166/273 |
| 3,506,071 | 4/1970 | Jones ............................ | 166/273 |

OTHER REFERENCES

Hackh's Chemical Dictionary, Third Edition, 1944, The Blakiston Co., Philadelphia, Pa., page 167, (QD 5 H3) Copy in Gp. 353

Tosch et al., " Emulsion Slugs of Improved Viscosity for Oil Recovery," Marathon Oil Company Technical Disclosure Bulletin, Volume No. III, Mar. 1966, page 5, 166– 275

*Primary Examiner*—Stephen J. Novosad
*Attorneys*—Joseph C. Herring, Jack L. Hummel and Richard C. Willson, Jr.

ABSTRACT: Oil is recovered from a subterranean oil-bearing reservoir by injecting a micellar dispersion into the reservoir and displacing it toward a production means in fluid communication with the reservoir; the dispersion is comprised of hydrocarbon, aqueous media, surfactant, carbohydrate and optionally cosurfactant and/or electrolyte. Examples of useful carbohydrates include glucose and sucrose.

SECONDARY OIL RECOVERY PROCESS USING MICELLAR DISPERSIONS

BACKGROUND OF THE INVENTION

U.S. Pat. No. 2,771,138 to Beeson teaches a water-flooding procedure in which a "bank of an aqueous sugar solution" is injected into the reservoir prior to a drive water. Preferred sugars include monosaccharides including dextrose, levulose, and disaccharides including sucrose, and maltose. Metal salts such as the sulfates, chlorides, bromides, nitrates, and phosphates of lithium, aluminum and beryllium must be incorporated into the carbohydrate solutions to increase the viscosity of the aqueous sugar solution.

SUMMARY OF THE INVENTION

Applicants have discovered that carbohydrates are useful in micellar dispersions to control the viscosity of the dispersion, especially when the dispersion is used in flooding subterranean formations. The micellar dispersion is comprised of hydrocarbon, aqueous media, surfactant, carbohydrate and optionally cosurfactant and/or electrolyte. The carbohydrate is particularly useful to reduce the viscosity of the micellar dispersion slug where the hydrocarbon and/or sulfonate component tends to increase the viscosity, thereby obtaining viscosity control to increase the effectiveness of oil recovery. Also, the carbohydrate additives are inert to certain "leaching" actions within the reservoir, e.g. the additives are not leached out in an oil-wet reservoir.

DESCRIPTION OF THE INVENTION

The term "micellar dispersion" as used herein is meant to include micellar solutions, microemulsions, "transparent" emulsions (Blair, Jr. et al., U.S. Pat. No. 2,356,205 ) and micellar solution technology taught in C. G. Sumner Clayton's, The Theory of Emulsions and Their Technical Treatment, 5th Ed., pp. 315—320 (1954).

The micellar dispersions used in this invention contain hydrocarbon, aqueous media, surfactant, and carbohydrate. Cosurfactant and/or electrolyte may also be incorporated into the dispersion. Examples of volume amounts include from about 4 to about 60 percent or more of hydrocarbon, from about less than 20 percent to about 90 percent aqueous media, at least about 4 percent surfactant, from about 0.1 to 3 percent (weight percent) or more of carbohydrate, from about 0.01 to about 20 percent or more of cosurfactant and from about 0.001 percent to about 5 percent (based on weight) of electrolyte. The micellar dispersion can be oil-external or water-external but preferably is oil-external.

Examples of hydrocarbons include crude oil (both sweet and sour), partially refined fractions of crude oil, and refined fractions of crude oil. Specific examples of hydrocarbons and mixtures thereof include side cuts from crude columns, crude column overheads, gasoils, kerosene, heavy naphthas, naphthas, straight run gasoline, liquefied petroleum gases, propane, pentane, heptane, decane, dodecane, cyclohexane, aryl compounds including benzene, and naphthenic and anthrenic-type compounds, and alkylated aryl compounds such as alkylphenols, etc. Preferably, the hydrocarbon is one locally available and can be crude oil characteristic of the reservoir being flooded; also the hydrocarbon can be unsulfonated hydrocarbon within the surfactant, e.g. unreacted hydrocarbon in petroleum sulfonate.

The aqueous media can be soft water, brackish water, or brine water. Preferably, the water is soft but it can contain small amounts of salts which are compatible with the ions within the subterranean formation.

Surfactants useful in the micellar dispersion include nonionic, cationic, and anionic surfactants. Examples include those surfactants taught in U.S. Pat. No. 3,254,714 to Gogarty et al. Other useful surfactants include Duponol FAQE (a 30 percent active sodium lauryl sulfate marketed by DuPont Chemical C or P., Wilmington, Delaware), Energetic W–100 (a polyoxyethylene alkylphenol marketed by Armour Chemical Co., Chicago, Illinois), Triton–XF 100 (an alkylphenoxy polyethoxyethanol marketed by Rohm & Haas, Philadelphia, Pennsylvania) and Arquad 12 –50 (a 50 percent active dodecyl trimethyl ammonium chloride marketed by Armour Chemical Co., Chicago, Illinois), and like materials.

Preferably, the surfactant is a petroleum sulfonate, also known as alkyl aryl naphthenic sulfonate. The sulfonate can contain a monovalent, divalent or higher valency cation. Examples of preferred surfactants are the sodium and ammonium petroleum sulfonates having an average equivalent weight within the range of from about 360 to about 520, and more preferably from about 400 to about 450. The surfactant can be a mixture of low and high-average molecular weight sulfonates or a mixture of two or more different surfactants.

Cosurfactants or cosolubilizers useful with the invention can have limited solubility to infinite water solubility. Examples include alcohols, amino compounds, esters, aldehydes and ketones containing from 1 up to about 20 or more carbon atoms and more preferably from about 3 to about 16 carbon atoms. The cosurfactant is preferably an alcohol, e.g. isopropanol, n-butanol, isobutanol, the amyl alcohols such as n-amyl alcohol, 1 - and 2- hexanol, 1- and 2 -octanol, decyl alcohols, alkaryl alcohols such as p-nonyl phenol and alcoholic liquors such as fusel oil. Particularly useful alcohols include the primary butanols, primary pentanols and primary and secondary hexanols. Preferably from about 0.01 to about 5.0 percent of cosurfactant is useful in the dispersions. Mixtures of two or more cosurfactants are useful.

Electrolytes useful within the micellar dispersions include inorganic bases, inorganic acids, inorganic salts, organic bases, organic acids, and organic salts which are strongly or weakly ionized. Preferably, the electrolytes are inorganic bases, inorganic acids and inorganic salts, e.g., sodium hydroxide, sodium chloride, sodium sulfate, hydrochloric acid, sulfuric acid, and sodium nitrate. Examples of other useful electrolytes can be found in U.S. Pat. No. 3,330,343.

The mobility of the micellar dispersion is desirably about equal to or less than the mobility of the formation fluids (i.e., combination of crude oil and interstitial water) ahead of the dispersion. Preferably, the micellar dispersion has a mobility favorable to protect against viscous instability, i.e., fingering of the micellar dispersion into the formation fluids. Part or all of the micellar dispersion can be graded from a low mobility at the front of the dispersion to a high mobility at the back of the dispersion.

Size of the micellar dispersion slug useful with this invention is preferably from about 1 percent to about 20 percent formation pore volume. Larger pore volumes are useful but such may be economically unattractive. More preferably, from about 2 percent to about 10 percent formation pore volumes are useful and from about 3 percent to about 6 percent formation pore volumes give very efficient results.

A mobility buffer slug may be injected after the micellar dispersion. Such protects against substantial fingering of a subsequent drive material e.g., drive water, hydrocarbon drive, etc.,) into the micellar dispersion. The mobility buffer slug can have a mobility about equal to or less than that of the micellar dispersion and can have mobilities graded to a high of that of the drive material.

Useful carbohydrates include the monosaccharides, disaccharides or mixtures of the two, trisaccharides, tetrasaccharides, polysaccharides and the conjugated saccharides. Mixtures of carbohydrates are useful such as a mixture of monosaccharides and disaccharides. Examples of such carbohydrates include those found in Hackh's Chemical Dictionary, 3 rd Edition, page 167. An especially useful carbohydrate is the L-Series or B-Series of the aldoses or ketoses.

The percentage of carbohydrate in the micellar dispersion will naturally vary with reservoir conditions, etc. Generally, from about 20 percent to about 90 percent of the dispersion slug can be composed of carbohydrate and water. A range of from about 20 to about 70 percent is more preferable.

The following examples present certain embodiments of the invention. Unless otherwise specified, percents are based on volume.

EXAMPLE I

A 4'long by 3"diameter fired Berea sandstone core having an average permeability of 598 md. is waterflooded to residual oil saturation, 360.0 cc. (cubic centimeters) of oil remains in the core. The core is then flooded with 30 percent pore volume of a sugar and aluminum sulfate solution (specifically as given in the Beeson patent, U.S. Pat. No. 2,771,138, table 1). The solution, 38 percent sucrose and 17 percent aluminum sulfate, has an apparent Brookfield viscosity of 37 centipoise at ambient temperature. The Beeson solution is followed with 1.0 pore volume of thickened water (contains 1,200 p.p.m. of Dow Pusher 530, a high-molecular weight, partially hydrolyzed polyacrylamide). Only 4.4 percent of the oil is recovered, i.e., only 16 cc. of the original 360 cc.

EXAMPLE II

The procedure of example I is duplicated except the permeability of the core is 640 and the oil content of the core after waterflooding is 366 cc. In place of the Beeson solution, there is injected 12 percent pore volume of a micellar dispersion containing 8.7 percent of sodium petroleum sulfonate (activity about 62 percent, average equivalent weight = 460), 53.5 percent straight-run gasoline, 4.3 percent isopropyl alcohol, and 33.5 percent of sucrose and water obtained by dissolving 87.5 grams of sucrose diluted in 175 milliliters of distilled water. As in example I, one pore volume of thickened water is injected after the dispersion. The carbohydrate containing micellar dispersion recovers 301.0 cc. of the 366.0 cc. oil in the core. Thus, 82.2 percent of the total oil is recovered.

EXAMPLE III

The procedure of example II is repeated except the micellar dispersion contains 8.0 percent of the sulfonate defined in example II, 24.5 percent heptane, 24.5 percent methylcyclopentane, 3.1 percent isopropyl alcohol, and 39.9 percent glucose/distilled water (33.3 percent by weight glucose). The dispersion is followed by 0.95 pore volume thickened water. Of the total oil in the core, 87 percent is recovered.

The above examples are not meant to limit the invention. Rather, equivalents and practical variations are meant to be included within the scope of the invention as defined in the specification and appended claims.

What is claimed is:

1. In a process for the recovery of hydrocarbon from a hydrocarbon-bearing subterranean formation having at least one injection means in fluid communication with at least one recovery means, the process comprising injecting into the formation a micellar dispersion comprised of hydrocarbon, surfactant, aqueous medium, and carbohydrate to reduce the viscosity of the micellar dispersion, displacing said dispersion toward the recovery means and recovering hydrocarbon through said recovery means.

2. The process of claim 1 wherein the carbohydrate is selected from the group consisting of monosaccharides, disaccharides or mixtures of the two.

3. The process of claim 1 wherein the carbohydrate is selected from groups consisting of L-series or D-series of the aldoses or ketoses.

4. The process of claim 1 wherein the front portion of the micellar dispersion has a mobility about equal to or less than the mobility of the formation fluids.

5. The process of claim 1 wherein from about 1 to about 20 percent formation pore volume of the micellar dispersion is injected into the formation.

6. The process of claim 1 wherein the micellar dispersion contains from about 0.1 to about 30 percent by weight of the carbohydrate.

7. The process of claim 1 wherein a mobility buffer slug is injected after the micellar dispersion.

8. A process for the recovery of hydrocarbon from a hydrocarbon-bearing subterranean formation having at least one injection means in fluid communication with at least one recovery means, the process comprising injecting into the formation a micellar dispersion comprised of from about 4 percent to about 60 percent (by volume) hydrocarbon, from about 20 percent to about 90 percent aqueous medium, at least about 4 percent surfactant, and from about 0.1 percent to about 30 percent (by weight) of carbohydrate to reduce the viscosity of the micellar dispersion, displacing the dispersion through the formation toward the recovery means and recovering hydrocarbon through said recovery means.

9. The process of claim 8 wherein the micellar dispersion contains cosurfactant and/or electrolyte.

10. The process of claim 9 wherein the micellar dispersion contains from about 0.01 to about 20 percent by volume of cosurfactant and/or 0.001 to about 5 percent weight of electrolyte.

11. The process of claim 8 wherein at least the front portion of the dispersion has a mobility about equal to or less than that of the formation fluids.

12. The process of claim 8 wherein a mobility buffer slug is injected into the formation after the dispersion.

13. The process of claim 12 wherein a water drive is injected after the mobility buffer to displace the dispersion and mobility buffer toward the production means.

14. The process of claim 12 wherein the mobility of the mobility buffer slug is about equal to or less than that of the micellar dispersion.

15. The process of claim 13 wherein the mobility buffer slug has mobilities graded from a low at the front portion to a high mobility of about that of the drive material at the rear end of the mobility buffer slug.

16. The process of claim 8 wherein the carbohydrate is selected from the group consisting of monosaccharides, disaccharides or mixtures of the two.

17. The process of claim 8 wherein the carbohydrate is selected from the group consisting of glucose, sucrose or mixtures of glucose and sucrose.

UNITED STATES PATENT OFFICE
CERTIFICATE OF CORRECTION

Patent No. 3,613,787         Dated Dec. 1, 1971

Inventor(s) William C. Tosch et al

It is certified that error appears in the above-identified patent and that said Letters Patent are hereby corrected as shown below:

| | |
|---|---|
| Col. 1, line 44: | Delete "3%" and insert --30%--. |
| Col. 1, line 74: | Delete "C or P" and insert --Corp.--. |
| Col. 2, line 18: | Delete "high-average" and insert --high average--. |
| Col. 4, line 24: | After "90% insert --(by volume)--. |
| Col. 4, line 34: | After 5% insert --by--. |

Signed and sealed this 4th day of April 1972.

(SEAL)
Attest:

EDWARD M. FLETCHER, JR.
Attesting Officer

ROBERT GOTTSCHALK
Commissioner of Patents